United States Patent
Brazdrum et al.

(10) Patent No.: US 7,162,667 B2
(45) Date of Patent: Jan. 9, 2007

(54) METHOD FOR PREVENTING TOTAL FAILURE OF A PROCESSING UNIT FOR PROTOCOL INFORMATION

(75) Inventors: Helmut Brazdrum, Feldkirchen (DE); Alfred Burger, Mühldorf (DE)

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 10/498,082

(22) PCT Filed: Dec. 6, 2002

(86) PCT No.: PCT/DE02/04500

§ 371 (c)(1),
(2), (4) Date: Jun. 8, 2004

(87) PCT Pub. No.: WO03/054700

PCT Pub. Date: Jul. 3, 2003

(65) Prior Publication Data

US 2005/0015484 A1    Jan. 20, 2005

(30) Foreign Application Priority Data

Dec. 13, 2001   (DE)   ................ 101 61 295

(51) Int. Cl.
*G06F 11/00*   (2006.01)

(52) U.S. Cl. ........................................................ 714/55

(58) Field of Classification Search ................. 714/15, 714/27, 55
See application file for complete search history.

(56) References Cited

U.S. PATENT DOCUMENTS

| 5,313,456 | A | * | 5/1994 | Sugawara | 370/228 |
| 6,269,478 | B1 | * | 7/2001 | Lautenbach-Lampe et al. | 717/127 |
| 6,292,480 | B1 | * | 9/2001 | May | 370/352 |
| 6,304,983 | B1 | * | 10/2001 | Lee et al. | 714/48 |
| 6,357,014 | B1 | * | 3/2002 | Correia | 713/502 |
| 2002/0161992 | A1 | * | 10/2002 | Utsumi et al. | 713/1 |
| 2004/0254954 | A1 | * | 12/2004 | Gatto et al. | 707/104.1 |

FOREIGN PATENT DOCUMENTS

DE    199 21 247 A1    11/2000

* cited by examiner

*Primary Examiner*—Scott Baderman
*Assistant Examiner*—Joshua Lohn

(57) ABSTRACT

The invention relates to a method for preventing total failure in a processing unit for sending and receiving protocol information for a large number of transmission channels, wherein a protocol process is started by a controller for every protocol and a separate monitoring process that monitors the orderly time duration of the protocol process can be activated or deactivated parallel thereto for every protocol process. If the previously determined time duration of the protocol process is exceeded, the monitoring process reports it to the controller, whereupon the controller stores relevant data for subsequent localization of errors.

21 Claims, 1 Drawing Sheet

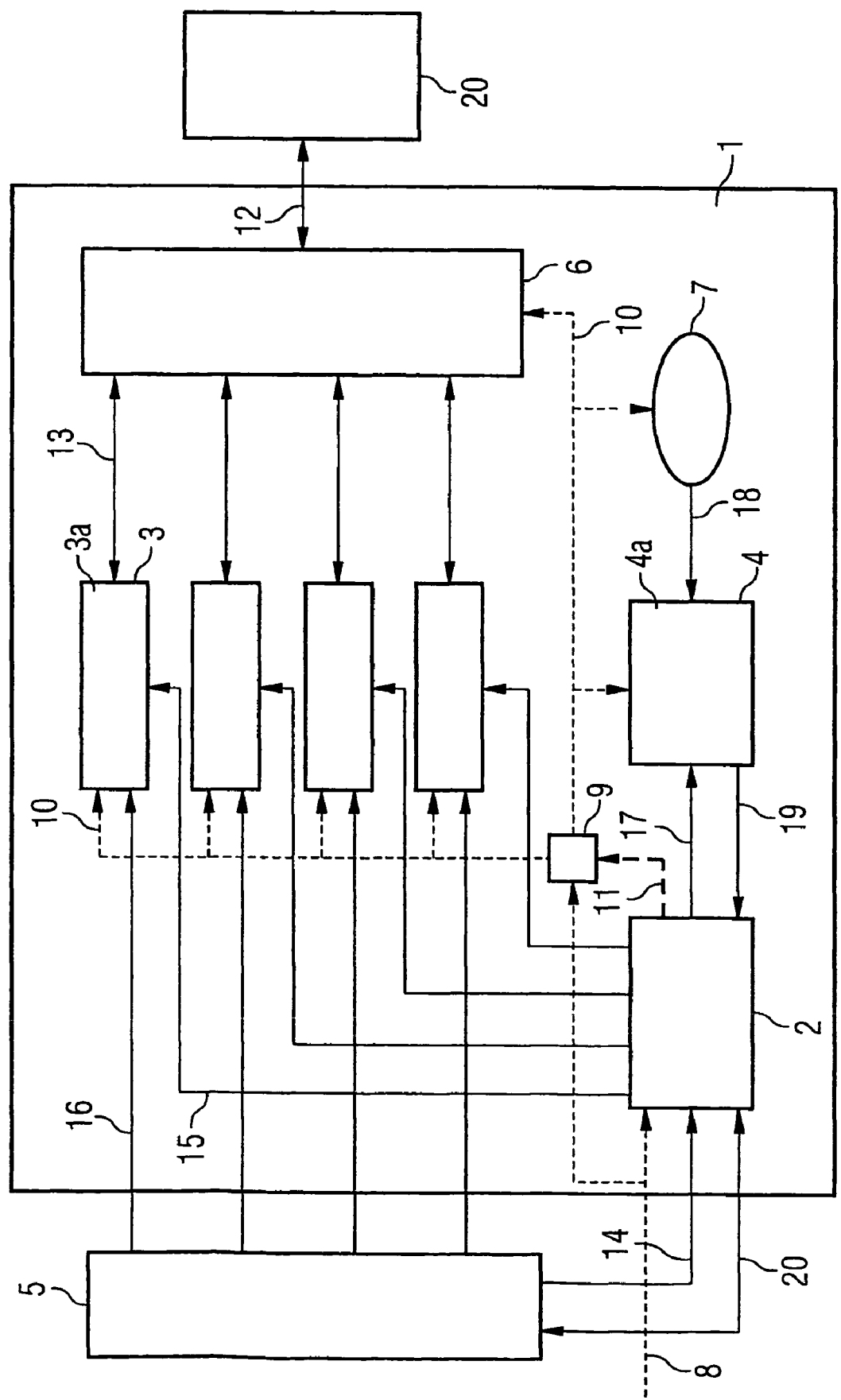

METHOD FOR PREVENTING TOTAL FAILURE OF A PROCESSING UNIT FOR PROTOCOL INFORMATION

CROSS REFERENCE TO RELATED APPLICATIONS

This application is the US National Stage of International Application No. PCT/DE02/04500, filed Dec. 6, 2002 and claims the benefit thereof. The International Application claims the benefits of German application No. 10161295.8 filed Dec. 13, 2001, both of the applications are incorporated by reference herein in their entirety.

FIELD OF INVENTION

The invention relates to a method for preventing total failure in a processing unit for sending and receiving protocol information and a processing unit for sending and receiving protocol information.

BACKGROUND OF INVENTION

The general background to the present invention is a processing unit, which sends and receives the information required by a protocol (e.g. SSCOP, #7, HDLC, internal transport protocol, etc.). Such processing units are integrated in many networks, to allow the transfer of data within the network.

Technical developments mean that the requirements relating to processing units are ever more stringent. For example protocol information has to be sent and received in increasingly short time units. This can be achieved on the one hand by minimizing the time required for a transmission operation and on the other hand by increasing the number of transmission channels.

To minimize the time required for a transmission operation, the protocol information is transported using high-performance switching technology, e.g. Asynchronous Transfer Mode (ATM).

Increasing the number of transmission channels in a processing unit for sending and receiving protocol information (currently approx. 16000) gives rise in some instances to management problems, as it is virtually impossible to support a corresponding number of transmission channels in the conventional manner.

In order to be able to support all channels, the protocol must be set up in the hardware, for example via an ASIC (Application Specific Integrated Circuit) and/or an FPGA (Field Programmable Gate Array).

ASICs are special chips, which are designed and optimized on the strength of specific deployment, to achieve a high level of performance.

To optimize the circuit design of said chips, the trend in recent years has moved away from the conventional digital circuit design with standard logic (74xx) to programmable logic. FPGA in particular has gained in significance as a result.

ATM and ASIC have been combined for the transmission of information since the end of the nineties. The combination is used successfully for example in the digital telephone switching system EWSD (Electronic Worldwide Switch Digital).

During the transmission of information what is known as a work split defines which part of the protocol is processed by the ASIC and which part of the protocol is processed by the subsequent software in the processor on the assembly.

Networks are generally tested before the actual transmission of useful data. It is however not possible due to the complexity of the protocols to test the processing of all situations beforehand. A certain error probability therefore always remains. This can mean that in some circumstances defective protocol information is received, which results in total failure of the system. The other transmission channels are thereby also affected.

If an error occurs in an ASIC, the following problems can potentially occur during error correction:
  error location is extremely difficult in a complex ASIC,
  immediate error rectification is not possible or is only possible by redesign, and
  protocol processing can only be restarted by resetting the hardware.

There is therefore a need for a method, which prevents total failure (deadlock) during protocol processing.

SUMMARY OF INVENTION

The object of the invention is therefore to develop a method, which prevents total failure during protocol processing.

This object is achieved according to the invention by the features of the independent Claims. The dependent Claims develop the central idea of the invention in a particularly advantageous manner.

The central concept of the invention is to achieve a method for preventing total failure in a processing unit for sending and receiving protocol information for a large number of transmission channels in that a protocol process is started by a controller for every protocol and parallel to this for every protocol process a separate monitoring process can be activated, which is started at the same time as the protocol process and monitors the time duration of the protocol process to identify a defective transmission channel.

It is also necessary for it to be possible for the software to activate and deactivate the monitoring process separately for every protocol process.

The monitoring process advantageously reports to the controller if as previously defined time duration of the protocol process is exceeded. If it is, it must be assumed that the protocol information is defective, putting protocol processing in a "deadlock" state.

It is particularly advantageous, if the duration of the monitoring process can be adjusted separately for every protocol process, as the different processes require different times. Alternatively the duration of all monitoring processes can be defined as the maximum possible process duration. This however results in an unnecessary time delay in the identification of defective protocol information.

A time base, which predefines a basic clock rate, is integrated in the processing unit to control the time duration of the monitoring process.

According to the invention the controller secures the data relevant to the subsequent error location, as soon as it receives a report from the monitoring process that the duration of the protocol process is exceeding the previously defined time. The relevant data includes the name of the protocol process, the current state of the protocol process and/or further signal states. It is stored in registers.

The controller then resets the processing unit, whereby the data, which is stored for subsequent error location, is retained.

After the reset operation the controller starts a process, which reads the last received message triggering the error response from the receive storage device and forwards it together with the stored data for error location to external software.

The processing unit is then ready to process the next message and total failure does not result.

The defective transmission channel of the processing unit is also blocked and can only be released by the software after successful error rectification.

BRIEF DESCRIPTION OF THE DRAWING

One example of the sequence for processing protocol information according to the invention is described below with reference to FIG. 1.

DETAILED DESCRIPTION OF INVENTION

The protocol information is transmitted for example in ATM cells to a processing unit 1. There is therefore a hardware unit on the receive side of the processing unit 1 for processing the received protocol information. In the present case this is an RA (Receive ATM Adaptation Layer).

The received protocol information is buffered in a receive storage device 5. The storage device manager sends a signal 14 to the controller 2 that information has to be processed. The controller then decides on the basis of a control word (protocol mode) which protocol 3 said message is intended for. Every protocol 3 has a specific process, which is started by the controller 2 by means of a start signal 15. The protocol process 3a processes the information and then transmits all the relevant data via a signal 13 to a bus interface 6, which in turn forwards it via a signal 12 to subsequent software in the processor on the assembly for further processing.

To monitor the time of the protocol process 3a, a monitoring process 4a is started parallel to this and at the same time in a monitoring unit 4 by means of a start signal 17. The maximum permitted duration of the monitoring process is determined individually for every protocol process 4a. For the purposes of time optimization, it is determined as the time required by the protocol process 3a for error-free processing. To control the duration of the monitoring period, the monitoring process 4a obtains a basic clock rate 18 from a time base 7.

When the protocol process 3a terminates its work stages, it signals this to the controller 2, which then stops the monitoring process 4a. It is therefore essential that every monitoring process 4a can be deactivated separately. The storage device manager of the receive storage device 5 is then informed that the information has been processed and the next message can therefore be processed.

If the monitoring process 4a is terminated before the protocol process 3a is terminated, it must be assumed that the protocol information is defective, thereby putting protocol processing in a "deadlock" state.

In this case the monitoring process 4a reports the existence of defective protocol information to the controller 2 by means of an error notification 19. The controller 2 then secures all relevant data, such as the name of the protocol process that caused the error, the current state of the protocol process to locate the cause of the error and/or further signal states as a function of the respective protocol in registers.

The controller 2 then resets the entire unit, whereby the data stored for subsequent error location is retained. The protocol process 3a, the monitoring unit 4, the time base 7 and the bus interface are thereby reset. This can be achieved for example in that the reset signal 10 is generated by an OR circuit 9, to which the output signal 111 of the controller 2 and the external reset signal 8 are fed.

After the reset operation, the controller 2 starts a process, which reads the last received message triggering the error response from the receive storage device 5 via a signal 16 and forwards it together with the stored data for error location to the external software 20.

A signal is then sent to the storage device manager of the receive storage device 5 that the information has been processed and the next message can be processed.

The defective transmission channel is also immediately blocked by the software 20 or the hardware and can only be released again by the software 20 after successful error rectification.

The invention therefore allows total failure to be prevented in a processing unit in the event of defective protocol information and the cause of the error to be determined.

The invention claimed is:

1. A method for preventing a deadlock failure in a processing unit that sends and receives protocol information for a plurality of transmission channels, comprising:
   receiving a message having a protocol;
   starting a protocol process by a controller, the protocol process adapted for processing the protocol information in the message;
   starting a separate monitoring process when starting the protocol process, the monitoring process having a time duration and also associated with the protocol process, the time duration of the monitoring process being at least the amount of time required by the protocol process for a deadlock-free processing of the protocol information; and
   notifying the controller by the monitoring process of the deadlock failure when the monitoring process has not been terminated via the controller after exceeding the time duration,
   wherein the deadlock failure is used to indicate that the protocol information in the received message is defective.

2. The method according to claim 1, further comprising:
   terminating the protocol process after completing the processing of the protocol information;
   informing the controller of the termination of the protocol process; and
   terminating the associated monitoring process,
   wherein the protocol process is terminated prior to the time duration of the associated monitoring process.

3. The method according to claim 2, wherein the time duration of the monitoring process is measured on the basis of a basic clock rate predefined by a time base.

4. The method according to claim 2, further comprising storing relevant data for a subsequent failure processing by the controller in response to a receipt of the failure notification.

5. The method according to claim 4, wherein the relevant data comprises the name of the protocol process, the current state of the protocol process and/or further signal states.

6. The method according to claim 5, wherein the controller resets the processing unit, whereby the data stored for subsequent failure processing is retained.

7. The method according to claim 6, wherein after the reset operation the controller starts a process that reads the last received message triggering the failure response from the receive data storage unit and forwards it together with the stored data for error location to an external software program.

8. The method according to claim 7, wherein the defective transmission channel is immediately blocked.

9. The method according to claim 8, wherein the external software program unblocks the defective transmission channel after successful error rectification.

10. A processing unit for sending and receiving protocol information for a large number of transmission channels, comprising:
a controller that starts a protocol process for every protocol, the protocol process adapted to process protocol information; and
a monitoring process activated for each started protocol process such that each started protocol process has an associated monitoring process,
wherein the monitoring process monitors the time duration of the protocol process, the time duration being at least the amount of time required by the protocol process for a deadlock-free processing of the protocol information, and
wherein a defective protocol error is detected if the protocol process has not processed the protocol information within the duration time.

11. The processing unit according to claim 10, further comprising a time base which predefines a basic clock rate that the time duration of the monitoring process is measured.

12. The processing unit according to claim 10, wherein the monitoring sends an error notification message to the contoller after the error is detected.

13. The processing unit according to claim 10, wherein upon receipt of the message the controller stores relevant data for subsequent error location in a register.

14. The processing unit according to claim 13, wherein the controller resets the processing unit, whereby the data stored for subsequent error location is retained.

15. The processing unit according to claim 14, wherein after the reset operation the controller starts a process that reads the last received message triggering an error response from the receive storage device and forwards it together with the stored data via a bus interface for error location to an external software program.

16. The processing unit according to claim 15, wherein the controller is connected to the external reset signal via an OR circuit.

17. The processing unit according to claim 16, wherein the defective transmission channel is blocked by the external software program.

18. The processing unit according to claim 17, wherein the external software program releases the defective transmission channel after error rectification.

19. A method for avoiding a deadlock failure in a processing unit that sends and receives protocol information for a plurality of transmission channels, comprising:
receiving a message having a protocol;
starting a protocol process by a controller, the protocol process adapted for processing the protocol information in the message;
starting a monitoring process associated to the protocol process processes, the monitoring process having a duration time related to the protocol of the associated protocol process, the monitoring process started when the associated protocol process started;
after completing the processing of the protocol information:
terminating the protocol process,
informing the controller of the termination of the protocol process, and
terminating the associated monitoring process; and
after exceeding the time duration:
notifying the controller by the monitoring process of an error after exceeding the time duration, the error is used to indicate that the protocol information is defective,
wherein the deadlock failure is used to indicate that the protocol information in the received message is defective.

20. The method according to claim 19, further comprising:
saving information pertaining to the received message;
blocking a transmission channel having sent the received message in response to the notification; and
resetting the processing unit by the controller in response to the notification.

21. The method according to claim 20, further comprising:
starting a process to read the saved information after the resetting; and
forwarding the read information to an external program.

* * * * *